(12) United States Patent
Suzuki et al.

(10) Patent No.: US 11,085,494 B2
(45) Date of Patent: Aug. 10, 2021

(54) DOG CLUTCH OF VEHICLE POWER TRANSMISSION DEVICE

(71) Applicant: TOYOTA JIDOSHA KABUSHIKI KAISHA, Toyota (JP)

(72) Inventors: Toshio Suzuki, Toyota (JP); Takaaki Ito, Toyota (JP); Yoshisuke Kametani, Nagoya (JP); Shinya Kuwabara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 16/232,467

(22) Filed: Dec. 26, 2018

(65) Prior Publication Data

US 2019/0195290 A1 Jun. 27, 2019

(30) Foreign Application Priority Data

Dec. 26, 2017 (JP) .............................. JP2017-250213
Dec. 21, 2018 (JP) .............................. JP2018-240299

(51) Int. Cl.
*F16D 11/14* (2006.01)
*F16D 23/04* (2006.01)
(Continued)

(52) U.S. Cl.
CPC .............. *F16D 11/14* (2013.01); *F16D 23/04* (2013.01); *F16D 23/14* (2013.01); *F16D 25/061* (2013.01);
(Continued)

(58) Field of Classification Search
CPC .......... F16D 11/14; F16D 23/04; F16D 23/14; F16D 2011/002; F16H 2063/3093
(Continued)

(56) References Cited

U.S. PATENT DOCUMENTS 3,175,413 A * 3/1965 Peras ...................... F16D 23/06
74/339
3,511,116 A * 5/1970 Detra ...................... F16D 23/10
477/123
(Continued)

FOREIGN PATENT DOCUMENTS

CN 105090397 A 11/2015
CN 105370748 A 3/2016
(Continued)

*Primary Examiner* — Ha Dinh Ho
(74) *Attorney, Agent, or Firm* — Oliff PLC

(57) ABSTRACT

A dog clutch of a vehicle power transmission device includes a sleeve, the dog clutch connecting/disconnecting a first rotating shaft to/from a first gear by moving the sleeve between a neutral position at which inner circumferential teeth formed on an inner circumferential side of the sleeve are not meshed with outer circumferential teeth on a side surface side of the first gear and an engagement position at which the inner circumferential teeth are meshed with the outer circumferential teeth, the inner circumferential teeth and the outer circumferential teeth having inclined surfaces tooth thicknesses of which become larger as the inner circumferential teeth and the outer circumferential teeth approach each other, and when the sleeve is moved to an engagement position by a shift fork, the sleeve being held in contact with a side surface of the first gear.

9 Claims, 7 Drawing Sheets

(51) Int. Cl.
*F16D 23/14* (2006.01)
*F16H 63/30* (2006.01)
*F16D 48/02* (2006.01)
*F16D 25/061* (2006.01)
*F16H 37/08* (2006.01)
*F16D 11/00* (2006.01)

(52) U.S. Cl.
CPC ......... *F16D 25/14* (2013.01); *F16H 37/0846* (2013.01); *F16H 63/3023* (2013.01); *F16D 2011/002* (2013.01); *F16D 2023/141* (2013.01); *F16H 2037/0866* (2013.01); *F16H 2063/3093* (2013.01)

(58) Field of Classification Search
USPC .......................................................... 74/664
See application file for complete search history.

(56) References Cited

U.S. PATENT DOCUMENTS

| | | | | |
|---|---|---|---|---|
| 3,921,469 | A | * | 11/1975 | Richards ................... F16H 3/12 |
| | | | | 74/339 |
| 4,257,284 | A | * | 3/1981 | Ashauer .............. F16D 23/0612 |
| | | | | 192/218 |
| 2015/0354682 | A1 | | 12/2015 | Yamamoto et al. |
| 2017/0305428 | A1 | | 10/2017 | Matsuo et al. |

FOREIGN PATENT DOCUMENTS

| | | |
|---|---|---|
| EP | 0 433 119 A1 | 6/1991 |
| JP | 2011-190861 A | 9/2011 |
| JP | 2015-224715 A | 12/2015 |
| JP | 2016-001029 A | 1/2016 |
| JP | 2016-050617 A | 4/2016 |
| JP | 2016-118242 A | 6/2016 |
| JP | 2017-044293 A | 3/2017 |

* cited by examiner

DOG CLUTCH OF VEHICLE POWER TRANSMISSION DEVICE

This application claims priority from Japanese Patent Application No. 2017-250213 filed on Dec. 26, 2017, the disclosure of which is herein incorporated by reference in its entirety.

TECHNICAL FIELD

The present invention relates to a dog clutch of a vehicle power transmission device and, more particularly, to a sleeve positioning structure.

BACKGROUND ART

There is known a dog clutch of a vehicle power transmission device, (a) the vehicle power transmission device including a first gear disposed relatively rotatably on a first rotating shaft rotating around one axis, a second gear fixed to a second rotating shaft parallel to the first rotating shaft and constantly meshed with the first gear, and a shift fork fixed to a non-rotating member and driven to reciprocate in a direction of the one axis by an actuator driving a dog clutch, the dog clutch comprising (b) a sleeve that is supported movably in a direction of the one axis and relatively non-rotatably by the first rotating shaft via a hub disposed relatively non-rotatably to the first rotating shaft and that has an annular outer circumferential recessed groove formed on an outer circumferential side and allowing slidable engagement with the shift fork, (c) the dog clutch connecting/disconnecting the first rotating shaft to/from the first gear by moving the sleeve between a neutral position at which inner circumferential teeth formed on an inner circumferential side of the sleeve are not meshed with a side surface side of outer circumferential teeth of the first gear and an engagement position at which the inner circumferential teeth are meshed with the outer circumferential teeth. For example, this corresponds to a dog clutch of a vehicle power transmission device described in Patent Document 1.

In dog clutches of vehicle power transmission devices described in Patent Documents 1 and 2, rotation speeds are synchronized between a transmission gear and a rotating shaft based on movement of the sleeve. Specifically, the sleeve is moved by a shift fork driven to reciprocate by an actuator, for example, and the inner circumferential teeth of the sleeve are engaged with, for example, outer circumferential teeth formed on the transmission gear so as to synchronize the rotation speeds of the transmission gear and the rotating shaft. The inner circumferential teeth of the sleeve and the outer circumferential teeth formed on the transmission gear are each formed in a tapered shape having a predetermined angle such that a tooth thickness becomes larger at positions closer to each other and, for example, when a torque is input to the dog clutch, a thrust force is generated in the sleeve in a direction to promote engagement, i.e., in the direction toward the transmission gear. As a result, the dog clutches of the vehicle power transmission devices described in Patent Documents 1 and 2 are restrained from causing the sleeve to move in a direction to promote disengagement from the transmission gear, i.e., so-called jumping-out of gear.

PRIOR ART DOCUMENTS

Patent Documents

Patent Document 1: Japanese Laid-Open Patent Publication No. 2017-044293

Patent Document 2: Japanese Laid-Open Patent Publication No. 2016-118242

SUMMARY OF THE INVENTION

Technical Problem

In the dog clutch of the vehicle power transmission device, it is conceivable that when the sleeve is positioned at the engagement position by the actuator, the sleeve is held at a position where the engagement is completed between the inner circumferential teeth and the outer circumferential teeth. Therefore, in the dog clutches of the vehicle power transmission devices described in Patent Documents 1 and 2, the non-rotating shift fork contacts to a contact surface of the rotating sleeve in a sliding manner with a contact surface pressure due to the thrust force at the engagement position of the sleeve. Therefore, the dog clutches have a disadvantage that a sliding pad fixed to the shift fork tends to wear due to the sliding.

The present invention was conceived in view of the situations and it is therefore an object of the present invention to provide a dog clutch of a vehicle power transmission device suppressing wear which may occur in a sliding pad of a shift fork at an engagement position of a sleeve.

Solution to Problem

To achieve the above object, a first aspect of the present invention provides a dog clutch of a vehicle power transmission device, the vehicle power transmission device including a first gear disposed relatively rotatably on a first rotating shaft rotating around an axis, a second gear fixed to a second rotating shaft parallel to the first rotating shaft and constantly meshed with the first gear, and a shift fork driven to reciprocate along the axis by an actuator driving the dog clutch, the dog clutch comprising: a sleeve supported movably in a direction of the axis and relatively non-rotatably to the first rotating shaft by the first rotating shaft via a hub disposed relatively non-rotatably to the first rotating shaft on the first rotating shaft and the sleeve including an annular outer circumferential recessed groove formed on the outer circumferential side to be engaged with the shift fork in a slidable manner, the dog clutch connecting/disconnecting the first rotating shaft to/from the first gear by moving the sleeve between a neutral position at which inner circumferential teeth formed on the inner circumferential side of the sleeve are not meshed with outer circumferential teeth on the side surface side of the first gear and an engagement position at which the inner circumferential teeth are meshed with the outer circumferential teeth, wherein the inner circumferential teeth and the outer circumferential teeth have inclined surfaces tooth thicknesses of which become larger as the inner circumferential teeth and the outer circumferential teeth approach each other, and wherein when the sleeve is moved to the engagement position by the shift fork, the sleeve is held in contact with a side surface of the first gear.

A second aspect of the present invention provides the dog clutch of a vehicle power transmission device recited in the first aspect of the invention, wherein a projection projected toward the first gear is formed on a surface of the sleeve facing the first gear, and wherein when the sleeve is located at the engagement position, the projection is brought into contact with the side surface of the first gear.

A third aspect of the present invention provides the dog clutch of a vehicle power transmission device recited in the first or second aspect of the invention, wherein a synchronizer ring is disposed between the hub and the first gear and prevents the sleeve from moving to the engagement position until synchronization of rotations is completed between the outer circumferential teeth and the inner circumferential teeth.

A fourth aspect of the present invention provides the dog clutch of a vehicle power transmission device recited in any one of the first to third aspects of the invention, wherein the outer circumferential teeth are integrally formed on the side surface side of the first gear.

A fifth aspect of the present invention provides the dog clutch of a vehicle power transmission device recited in any one of the first to fourth aspects of the invention, wherein a sliding pad is fixed to a portion or a whole of a contact surface of the shift fork facing a side wall surface of the sleeve in the outer circumferential recessed groove, and wherein when the sleeve is held at the engagement position by a thrust from the actuator, the sliding pad is brought into sliding contact with the side wall surface in the outer circumferential recessed groove.

A sixth aspect of the present invention provides the dog clutch of a vehicle power transmission device recited in any one of the first to fifth aspects of the invention, wherein the actuator is a hydraulic actuator generating a thrust by a hydraulic pressure.

A seventh aspect of the present invention provides the dog clutch of a vehicle power transmission device recited in the sixth aspect of the invention, wherein the thrust of the actuator is controlled based on a torque transmitted between the first rotating shaft and the second rotating shaft.

An eighth aspect of the present invention provides the dog clutch of a vehicle power transmission device recited in any one of the first to seventh aspects of the invention, wherein the vehicle power transmission device is a parallel type power transmission device including a first power transmission path transmitting a power from an input shaft to an output shaft via a belt-type continuously variable transmission and a second power transmission path disposed parallel to the first power transmission path and transmitting a power from the input shaft to the output shaft via a reduction gear mechanism and the vehicle power transmission device further including a clutch mechanism alternatively switching the first power transmission path and the second power transmission path, and wherein the dog clutch is disposed in series with the reduction gear mechanism in the second power transmission path.

An ninth aspect of the present invention provides the dog clutch of a vehicle power transmission device recited in the sixth aspect of the invention, wherein the vehicle power transmission device includes an actuator thrust control portion for controlling a supplied hydraulic pressure to be supplied to the hydraulic actuator in order that the hydraulic actuator generates the thrust in a direction that the sleeve is in contact with a side surface of the first gear, and the actuator thrust control portion maintains the supplied hydraulic pressure constant regardless of an input torque transmitted to the first rotating shaft or reduces the supplied hydraulic pressure as an increase of the input torque.

Advantageous Effects of Invention

According to the dog clutch of a vehicle power transmission device recited in the first aspect of the invention, each of the inner circumferential teeth and the outer circumferential teeth has the inclined tooth surfaces the tooth thicknesses of which become larger as the inner circumferential teeth and the outer circumferential teeth approach each other, and when the sleeve is moved to the engagement position by the shift fork, the sleeve is held in contact with the side surface of the first gear. Therefore, when the sleeve is moved to the engagement position by the shift fork, the sleeve is held such that the sleeve is in contact with the side surface of the first gear, and therefore, for example, as compared to a case where the sleeve is brought into contact with the shift fork to position the sleeve against the thrust force generated due to the inclined tooth surfaces, the contact surface pressure can be reduced between the sleeve and the shift fork, i.e., the sliding surface pressure of the contact surface can be reduced between the sleeve and the shift fork. Thus, the abrasion of a member to be brought into sliding contact can be suppressed by the sliding between the sleeve that is the rotating member and the shift fork that is the non-rotating member.

According to the dog clutch of a vehicle power transmission device recited in the second aspect of the invention, the projection projected toward the first gear is formed on the surface of the sleeve facing the first gear, and when the sleeve is located at the engagement position, the projection is brought into contact with the side surface of the first gear. As a result, the sleeve is reliably brought into contact with the side surface of the first gear, so that the sleeve is more reliably held at the engagement position with the sleeve in contact with the side surface of the first gear.

According to the dog clutch of a vehicle power transmission device recited in the third aspect of the invention, the synchronizer ring is disposed between the hub and the first gear and prevents the sleeve from moving to the engagement position until synchronization of rotations is completed between the outer circumferential teeth and the inner circumferential teeth. As a result, rotation speeds can smoothly be synchronized between the first rotating shaft and the first gear.

According to the dog clutch of a vehicle power transmission device recited in the fourth aspect of the invention, the outer circumferential teeth of the first gear are integrally formed on the side surface side of the first gear. As a result, the outer circumferential teeth can be reduced in the number of parts and the number of manufacturing steps as compared to when a gear piece having the outer circumferential teeth is fixed to the first gear provided with meshing teeth for meshing with the second gear, so that costs can be reduced.

According to the dog clutch of a vehicle power transmission device recited in the fifth aspect of the invention, while the sliding pad is fixed to a portion or a whole of a contact surface of the shift fork facing the side wall surface of the outer circumferential recessed groove of the sleeve, and when the sleeve is held at the engagement position by the thrust from the actuator, the sliding pad is brought into sliding contact with the side wall surface of the outer circumferential recessed groove. As a result, abrasion due to sliding between the rotating sleeve and the non-rotating shift fork can be suppressed, and particularly, the abrasion of the sliding pad can be suppressed.

According to the dog clutch of a vehicle power transmission device recited in the sixth aspect of the invention, the actuator is the hydraulic actuator generating a thrust by a hydraulic pressure. As a result, the thrust of the actuator can appropriately be controlled by the hydraulic pressure, so that when the sleeve is moved to the engagement position by the shift fork, the position of the sleeve can more properly be held such that the sleeve is in contact with the side surface of the first gear. Therefore, the occurrence of jumping-out of gear can more reliably be suppressed, and abrasion of a member can further be suppressed by sliding between the rotating sleeve and the non-rotating shift fork.

According to the dog clutch of a vehicle power transmission device recited in the seventh aspect of the invention, the thrust of the actuator is controlled based on a torque transmitted between the first rotating shaft and the second rotating shaft. For example, if the so-called input torque, i.e., the torque transmitted between the first rotating shaft and the second rotating shaft, is relatively high, the control is provided to make the thrust of the actuator smaller as compared to when the input torque is relatively low. As a result, the thrust of the actuator is properly lowered according to the input torque, and therefore, when the sleeve is moved to the engagement position by the shift fork, sliding resistance between the sleeve and the shift fork can be reduced to improve the fuel consumption.

According to the dog clutch of a vehicle power transmission device recited in the eighth aspect of the invention, the vehicle power transmission device is a parallel type power transmission device including the first power transmission path transmitting a torque (power) from the input shaft to the output shaft via the belt-type continuously variable transmission, and the second power transmission path disposed parallel to the first power transmission path and transmitting a power from the input shaft to the output shaft via the reduction gear mechanism and the vehicle power transmission device further including the clutch mechanism alternatively switching the first power transmission path and the second power transmission path. The dog clutch is disposed in series with the reduction gear mechanism in the second power transmission path. As a result, the running pattern can be switched by the clutch mechanism in accordance with respective vehicle statuses, such as a low vehicle speed and a high vehicle speed, to a CVT running mode in which a torque is transmitted through the first power transmission path or a gear running mode in which a torque is transmitted through the second power transmission path, and the second power transmission path can completely be interrupted by releasing the dog clutch to prevent a torque from the drive wheel side during running of the vehicle from being input to the reduction gear mechanism. Therefore, since the power transmission path can be selected in accordance with a vehicle status for performing efficient running, the fuel consumption can be improved.

According to the dog clutch of a vehicle power transmission device recited in the ninth aspect of the invention, the vehicle power transmission device includes an actuator thrust control portion for controlling a supplied hydraulic pressure to be supplied to the hydraulic actuator in order that the hydraulic actuator generates the thrust in a direction that the sleeve is in contact with a side surface of the first gear, and the actuator thrust control portion maintains the supplied hydraulic pressure constant regardless of an input torque transmitted to the first rotating shaft or reduces the supplied hydraulic pressure as an increase of the input torque. Therefore, abrasion of the sliding pad fixed to the contact surface of the shift fork can be suppressed and the fuel consumption can be improved.

MODES FOR CARRYING OUT THE INVENTION

An example of the present invention will now be described in detail with reference to the drawings. In the following example, the drawings are simplified or deformed as needed and portions are not necessarily precisely drawn in terms of dimension ratio, shape, etc.

Example 1

Figure 1:
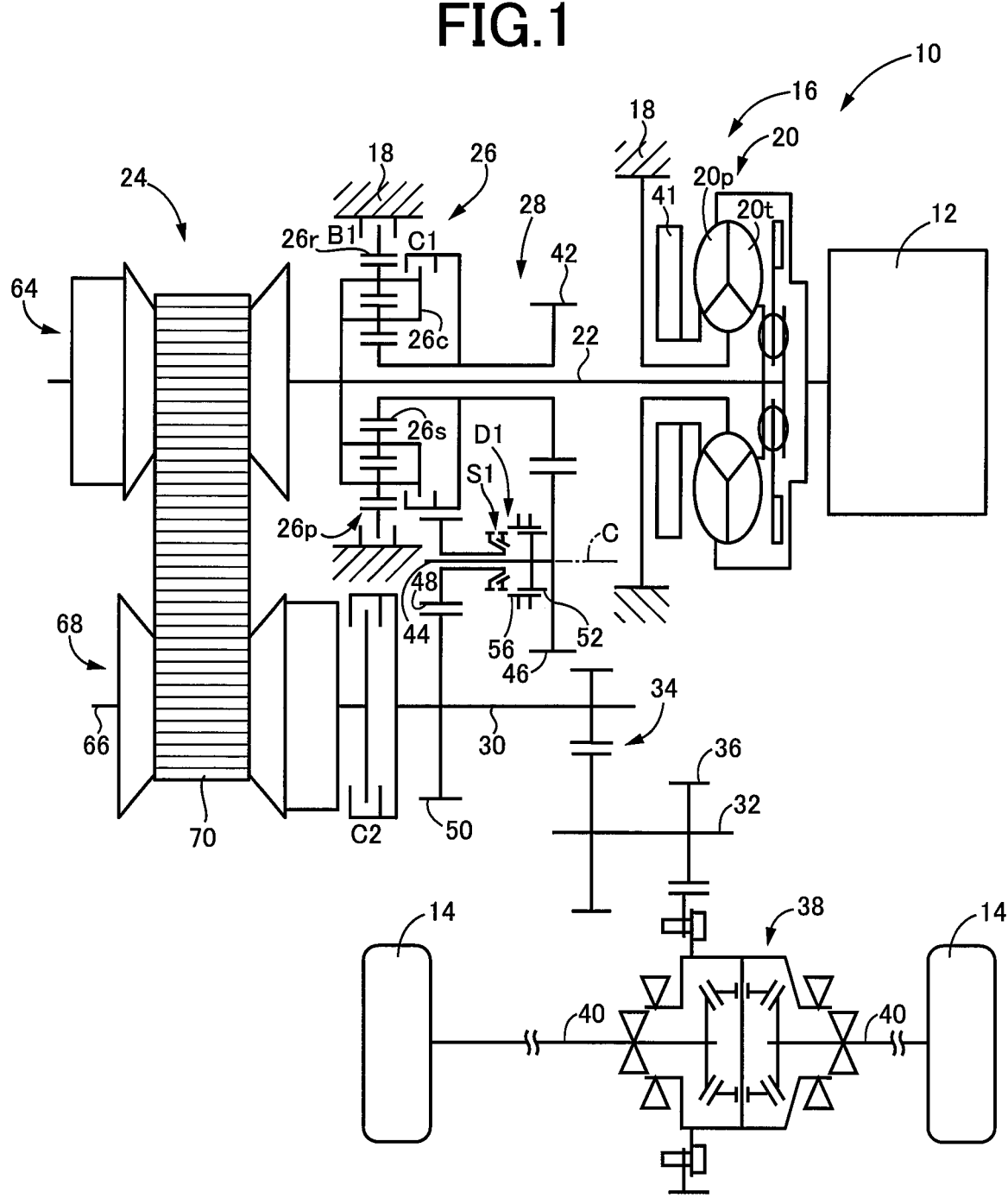
FIG. 1 is a diagram for explaining a schematic configuration of a vehicle including a vehicle power transmission device according to one example of the present invention.

FIG. 1 is a view for explaining a schematic configuration of a vehicle 10 to which a dog clutch D1 of a vehicle power transmission device 16 of the present invention is applied. In FIG. 1, the vehicle 10 includes an engine 12 functioning as a drive power source for running, drive wheels 14, and a vehicle power transmission device 16 disposed between the engine 12 and the drive wheels 14. The vehicle power transmission device 16 includes, in a housing 18 serving as a non-rotating member, a torque converter 20 as a hydraulic transmission device coupled to the engine 12, an input shaft 22 coupled to the torque converter 20, a known belt-type continuously variable transmission 24 (hereinafter referred to as a continuously variable transmission 24) as a continuously variable transmission mechanism coupled to the input shaft 22, a forward/reverse switching device 26 also coupled to the input shaft 22, a gear mechanism 28 as a reduction gear mechanism coupled through the forward/reverse switching device 26 to the input shaft 22 and disposed parallel to the continuously variable transmission 24. Further the vehicle power transmission device 16 includes an output shaft 30 in the form of a second rotating shaft that is an output rotating member common to the continuously variable transmission 24 and the gear mechanism 28, a counter shaft 32, a reduction gear device 34 composed of a pair of gears meshing each other and, disposed on and non-rotatably relative to the output shaft 30 and the counter shaft 32, respectively, a differential gear 38 coupled to a gear 36 disposed relatively non-rotatably on the counter shaft 32, a pair of axles 40 coupled to the differential gear 38, etc. In the vehicle power transmission device 16 configured as described above, power of the engine 12 is transmitted sequentially through the torque converter 20, the continuously variable transmission 24 or the forward/reverse switching device 26 and the gear mechanism 28, the reduction gear device 34, the differential gear 38, the axles 40, etc. to a pair of the drive wheels 14.

The vehicle power transmission device 16 is a parallel power transmission device including the continuously variable transmission 24 and the gear mechanism 28 disposed parallel to each other between the engine 12 and the drive wheels 14. Therefore, the vehicle power transmission device 16 includes a first power transmission path PT1 transmitting the power of the engine 12 from the input shaft 22 through the continuously variable transmission 24 toward the drive wheels 14 i.e., to the output shaft 30 and a second power transmission path PT2 transmitting the power of the engine 12 from the input shaft 22 through the gear mechanism 28 toward the drive wheels 14 i.e., to the output shaft 30. The vehicle power transmission device 16 is configured such that the first power transmission path PT1 and the second power transmission path PT2 are switched depending on a running state of the vehicle 10. The second power transmission path PT2 has a larger transmission ratio than that of the first power transmission path PT1, i.e., the second power transmission path PT2 is for lower speed relative to the first power transmission path PT1. The vehicle power transmission device 16 includes a CVT running clutch C2 as a first clutch connecting/disconnecting the first power transmission path PT1, a forward running clutch C1 as a second clutch connecting/disconnecting the second power transmission path PT2, a reverse running brake B1, and a dog clutch D1 with a synchromesh mechanism described later, as a clutch mechanism for selectively switching a power transmission path transmitting the power of the engine 12 toward the drive wheels 14 between the first power transmission path PT1 and the second power transmission path PT2.

The torque converter 20 is disposed concentrically with the input shaft 22 and around the input shaft 22 and includes a pump impeller 20p coupled to the engine 12 and a turbine impeller 20t coupled to the input shaft 22. The pump impeller 20p is coupled to a mechanically operated hydraulic oil pump 41 generating a hydraulic pressure used for control of supplying lubricating oil to portions of the power transmission path of the vehicle power transmission device 16, for example.

The forward/reverse switching device 26 is disposed concentrically with the input shaft 22 and around the input shaft 22 in the second power transmission path PT2 and includes a double pinion type planetary gear device 26p, the forward running clutch C1, and the reverse running brake B1. The planetary gear device 26p is a differential mechanism having three rotating elements, i.e., a carrier 26c as an input element, a sun gear 26s as an output element, and a ring gear 26r as a reaction force element. In the planetary gear device 26p, the carrier 26c is integrally coupled to the input shaft 22; the ring gear 26r is selectively coupled through the reverse running brake B1 to the housing 18; and the sun gear 26s is coupled to a small-diameter gear 42 disposed relatively rotatably around the input shaft 22 and coaxially with the input shaft 22. The carrier 26c and the sun gear 26s are selectively coupled through the forward running clutch C1.

The gear mechanism 28 includes the small-diameter gear 42 and a large-diameter gear 46 meshed with the small-diameter gear 42. The large-diameter gear 46 is disposed on a gear mechanism counter shaft 44 relatively non-rotatably with respect to the axial center C of the gear mechanism counter shaft 44, while a first rotating shaft, i.e., the gear mechanism counter shaft 44 is disposed rotatably around one axis, i.e., an axial center C. The gear mechanism 28 includes a first gear, i.e., an idler gear 48, which is a transmission gear disposed around the gear mechanism counter shaft 44 concentrically and relatively rotatably with respect to the gear mechanism counter shaft 44, and a second gear, i.e., an output gear 50, disposed around a second rotating shaft, i.e., the output shaft 30, concentrically and relatively non-rotatably with respect to the output shaft 30 and constantly meshed with the idler gear 48. The output gear 50 has a larger diameter than the idler gear 48.

The continuously variable transmission 24 is disposed on the first power transmission path PT1 between the input shaft 22 and the output shaft 30. The continuously variable transmission 24 includes a primary pulley 64 disposed on the input shaft 22 and having a variable effective diameter, a secondary pulley 68 disposed on a rotating shaft 66 coaxial with the output shaft 30 and having a variable effective diameter, and a transmission belt 70 wound between the paired pulleys 64, 68 and transmits power through a frictional force between the pair of the pulleys 64, 68 and the transmission belt 70. The CVT running clutch C2 is disposed between the continuously variable transmission 24 and the drive wheels 14, i.e., disposed between the secondary pulley 68 and the output shaft 30, to selectively connect/disconnect the secondary pulley 68, i.e., the rotating shaft 66, to/from the output shaft 30. In the vehicle power transmission device 16, the first power transmission path PT1 is established by engaging the CVT running clutch C2, and the power of the engine 12 is transmitted from the input shaft 22 via the continuously variable transmission 24 to the output shaft 30. In the vehicle power transmission device 16, when the CVT running clutch C2 is released, the first power transmission path PT1 is put into a neutral state.

The dog clutch D1 with a synchromesh mechanism (hereinafter referred to as a dog clutch D1) is disposed around the gear mechanism counter shaft 44 and between the large-diameter gear 46 and the idler gear 48 to selectively connect/disconnect the large-diameter gear 46 to/from the idler gear 48 based on a shift operation, for example. The dog clutch D1 is a dog clutch connecting/disconnecting the second power transmission path PT2 from the sun gear 26s to the output shaft 30 and acts as a third clutch disposed between the forward running clutch C1 and the output shaft 30 and connecting/disconnecting the second power transmission path PT2.

Figure 2:
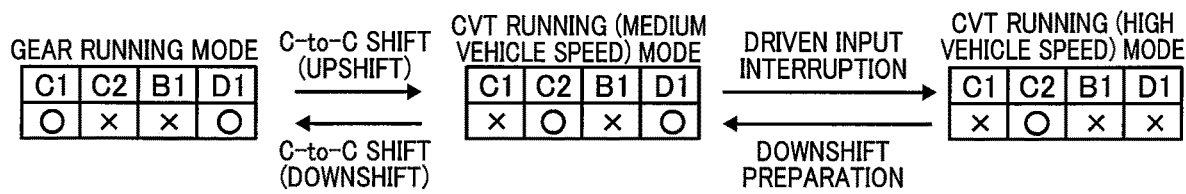
FIG. 2 is a diagram for explaining switching of running patterns of the vehicle power transmission device of FIG. 1 by using an engagement table of engagement elements for each of the running patterns.

FIG. 2 is a diagram showing an operation state of engagement elements of the vehicle power transmission device 16 of FIG. 1 for each of running patterns and explaining switching of the running patterns. Each column C1 in FIG. 2 denotes the operation state of the forward running clutch C1, each column C2 in FIG. 2 denotes the operation state of the CVT running clutch C2, each column B1 in FIG. 2 denotes the operation state of the reverse running brake B1, each column D1 in FIG. 2 denotes the operation state of the dog clutch D1, "◯" indicative of engagement (connection), and "x" indicative of release (interruption).

In a gear running mode that is a running pattern in which power is transmitted through the first power transmission path PT1, as shown in FIG. 2, for example, the forward running clutch C1 and the dog clutch D1 are engaged, while the CVT running clutch C2 and the reverse running brake B1 are released. In this way, when the forward running clutch C1 and the dog clutch D1 are engaged, the power of the engine 12 is transmitted sequentially through the torque converter 20, the forward/reverse switching device 26, the gear mechanism 28, the idler gear 48, etc. to the output shaft 30. In this gear running mode, for example, when the reverse running brake B1 and the dog clutch D1 are engaged while the CVT running clutch C2 and the forward running clutch C1 are released, reverse running of the vehicle 10 is performed.

In a CVT running mode that is a running pattern in which power is transmitted through the second power transmission path PT2, as shown in a CVT running (high vehicle speed) mode of FIG. 2, for example, the CVT running clutch C2 is engaged, while the forward running clutch C1, the reverse running brake B1, and the dog clutch D1 are released. When the CVT running clutch C2 is engaged, the power of the engine 12 is transmitted sequentially through the torque converter 20, the continuously variable transmission 24, etc. to the output shaft 30. The dog clutch D1 is released during this CVT running (high vehicle speed) mode so as to eliminate dragging of the gear mechanism 28 etc. during the CVT running mode and prevent high rotation of the gear mechanism 28 etc. at high vehicle speed, for example.

When switching is performed from the gear running mode to the CVT running (high vehicle speed) mode or from the CVT running (high vehicle speed) mode to the gear running mode, as shown in FIG. 2, the switching is performed transiently through a CVT running (medium vehicle speed) mode.

For example, when switching is performed from the gear running mode to the CVT running (high vehicle speed) mode, switching is transiently performed from a state corresponding to the gear running mode in which the forward running clutch C1 and the dog clutch D1 are engaged, to the CVT running (medium vehicle speed) mode that is a state in which the CVT running clutch C2 and the dog clutch D1 are engaged. In this case, the power transmission path is changed from the first power transmission path PT1 to the second power transmission path PT2, and the power transmission device 16 is substantially upshifted. After the power transmission path is switched, the dog clutch D1 is released to prevent unnecessary dragging and high rotation of the gear mechanism 28. In this way, the dog clutch D1 functions as a driven input interruption clutch interrupting the input from the drive wheels 14 side.

For example, if switching is performed from the CVT running (high vehicle speed) mode to the gear running mode, switching is transiently performed from a state in which the CVT running clutch C2 is engaged, to the CVT running (medium vehicle speed) mode that is a state in which the dog clutch D1 is further engaged, for preparation of switching to the gear running mode. When a C-to-C shift by changing the operation state of the clutches is executed from the CVT running (medium vehicle speed) mode such that the CVT running clutch C2 is released while the forward running clutch C1 is engaged, switching to the gear running mode is achieved. In this case, the power transmission path is changed from the second power transmission path PT2 to the first power transmission path PT1, and the power transmission device 16 is substantially downshifted.

Figure 3:
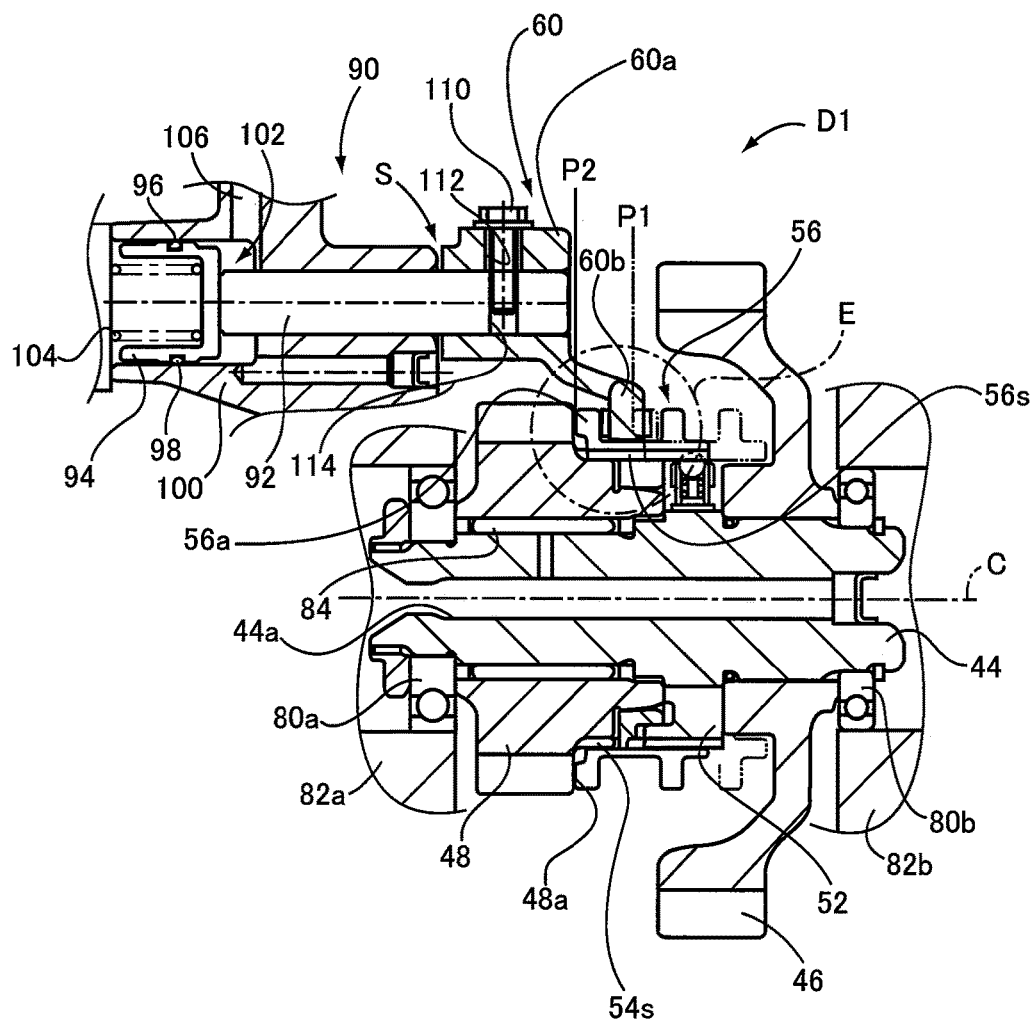
FIG. 3 is an enlarged view of a main portion of a dog clutch of the vehicle power transmission device disposed in the vehicle of FIG. 1.
Figure 4:
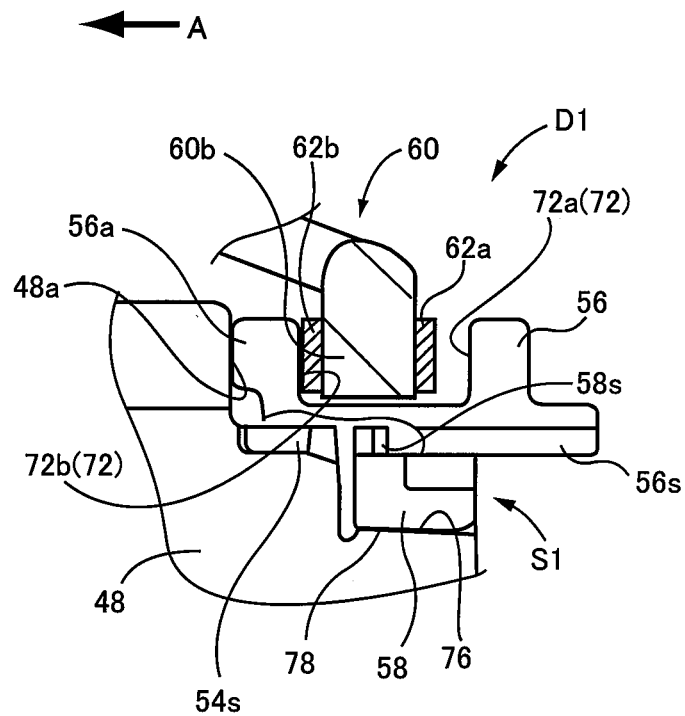
FIG. 4 is an enlarged view of a main portion of a rotation synchronizing mechanism disposed in the dog clutch of FIG. 3.

FIG. 3 is an enlarged view of a main portion of the dog clutch D1 of the vehicle power transmission device 16 disposed in the vehicle 10 of FIG. 1, and FIG. 4 is an enlarged view of a portion E surrounded by a dashed-dotted line of FIG. 3 and is an enlarged view of a main portion of a synchromesh mechanism S1 serving as a rotation synchronizing mechanism disposed in the dog clutch D1. As shown in FIG. 3, the gear mechanism counter shaft 44 is supported rotatably around the axial center C by a pair of support walls 82a, 82b via a pair of bearings 80a, 80b. The gear mechanism counter shaft 44 has a center hole 44a formed in the direction of the axial center C to penetrate through the gear mechanism counter shaft 44. While the gear mechanism counter shaft 44 is supported by the pair of the support walls 82a, 82b, a lubricating oil is supplied to the center hole 44a from an opening on the support wall 82a side of the paired support walls 82a, 82b.

The dog clutch D1 includes a hub 52 disposed around the gear mechanism counter shaft 44 coaxially and relatively non-rotatably with respect to the gear mechanism counter shaft 44. The dog clutch D1 includes an annular sleeve 56 relatively non-rotatably with respect to the gear mechanism counter shaft 44 via the hub 52 around the axial center C of the gear mechanism counter shaft 44 and relatively movably in a direction parallel to the axial center C. In the dog clutch D1, outer circumferential teeth (not shown) formed on an outer circumferential surface of the hub 52 and parallel to the axial center C are spline-fitted to inner circumferential teeth 56s on an inner circumferential surface of the sleeve 56 formed in an annular shape. Outer circumferential teeth 54s are integrally formed on the side of a side surface 48a of meshing teeth of the idler gear 48 meshed with the output gear 50. And the outer circumferential teeth 54s are disposed between the meshing teeth of the idler gear 48 and the hub 52. The inner circumferential teeth 56s of the sleeve 56 and the outer circumferential teeth 54s of the idler gear 48 are formed to have dimensions allowing the respective teeth 56s and 54s to mesh with each other, and the outer circumferential teeth 54s of the idler gear 48 correspond to one of paired sets of meshing teeth of the dog clutch D1 while the inner circumferential teeth 56s of the sleeve 56 correspond to the other of the paired sets of meshing teeth of the dog clutch D1. The idler gear 48 is relatively rotatably supported by the gear mechanism counter shaft 44 via a needle bearing 84.

The dog clutch D1 includes the synchromesh mechanism S1 as a rotation synchronizing mechanism. The synchromesh mechanism S1 synchronizes rotation speed of the sleeve 56 of the gear mechanism counter shaft 44 and rotation speed of the idler gear 48 before meshing between the inner circumferential teeth 56s of the sleeve 56 and the outer circumferential teeth 54s of the idler gear 48. FIG. 3 shows a state in which the sleeve 56 is located at an engagement position P2, i.e. a synchro engagement state in which the inner circumferential teeth 56s of the sleeve 56 are meshed with the outer circumferential teeth 54s of the idler gear 48. The engagement position P2 is a position at which a projection 56a described later formed on an end portion of the idler gear 48 side of the sleeve 56 is in contact with the side surface 48a of the meshing teeth of the idler gear 48.

As shown in FIG. 4, the synchronizer ring 58 is formed in an annular shape, and an outer circumferential surface of the synchronizer ring 58 is provided with outer circumferential teeth 58s that can be meshed with the inner circumferential teeth 56s of the sleeve 56. An inner circumferential surface of the synchronizer ring 58 is provided with a tapered inner circumferential surface 78 coming into surface contact with a tapered outer circumferential surface 76 of the idler gear 48. The tapered inner circumferential surface 78 has an inner diameter decreasing as the surface 78 extends away from the outer circumferential teeth 54s of the idler gear 48 in the axial center C direction. The synchronizer ring 58 is relatively rotatably supported by the idler gear 48.

The sleeve 56 indicated by a dashed-two dotted line of FIG. 3 shows a state in which the sleeve 56 is located at a neutral position P1. The state in which the sleeve 56 is located at a neutral position P1, a state in which the sleeve 56 and the idler gear 48 are not meshed with each other, i.e., a released state in which the inner circumferential teeth 56s of the sleeve 56 are not meshed with the outer circumferential teeth 54s of the idler gear 48. While the sleeve 56 is at the neutral position P1, the inner circumferential teeth 56s of the sleeve 56 are also not meshed with the outer circumferential teeth 58s of the synchronizer ring 58. When the sleeve 56 is moved toward the idler gear 48 and moved from the neutral position P1 to the engagement position P2, the inner circumferential teeth 56s of the sleeve 56 are meshed with the outer circumferential teeth 54s of the idler gear 48 through the outer circumferential teeth 58s of the synchronizer ring 58 as shown in FIG. 4. As a result, the rotation of the gear mechanism counter shaft 44 is transmitted via the dog clutch D1 to the idler gear 48.

Figure 5:
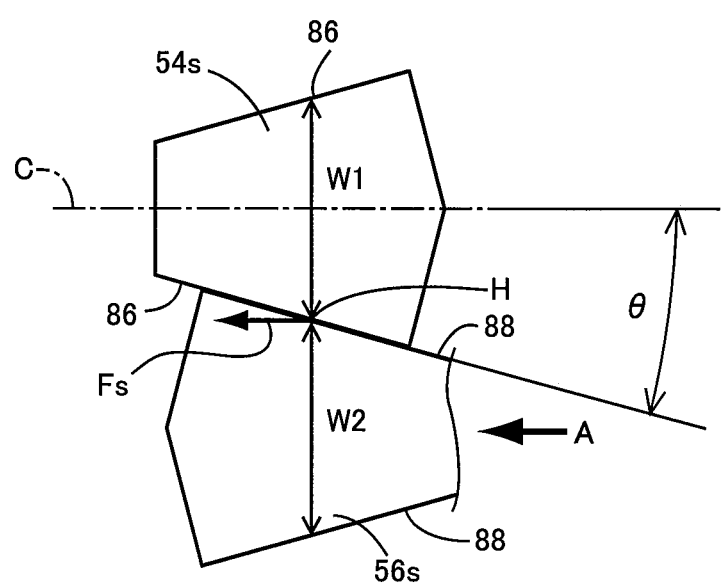
FIG. 5 is an enlarged view of a state of meshing between inner circumferential teeth of a sleeve and outer circumferential teeth of an idler gear in the dog clutch of FIG. 3.

FIG. 5 is an enlarged view of a state of meshing between the inner circumferential teeth 56s of the sleeve 56 and the outer circumferential teeth 54s of the idler gear 48 of FIGS. 3 and 4. An arrow A of FIG. 5 indicates a direction of movement of the sleeve 56 from the neutral position P1 to the engagement position P2, i.e., an engagement direction of the sleeve 56. As shown in FIG. 5, each of the outer circumferential teeth 54s has first tooth surfaces 86 that are a pair of tapered inclined tooth surfaces formed as increasing a tooth thickness W1 toward an end portion on the inner circumferential teeth 56s side of the sleeve 56 in a tooth width direction of the outer circumferential teeth 54s, i.e. in a direction around the axial center C. Each of the inner circumferential teeth 56s has second tooth surfaces 88 that are a pair of inclined tooth surfaces formed as increasing a tooth thickness W2 toward an end portion on the outer circumferential teeth 54s side of the idler gear 48 in a tooth width direction of the inner circumferential teeth 56s, that is, in a direction around the axial center C. Therefore, in a state that the inner circumferential teeth 56s of the sleeve 56 and the outer circumferential teeth 54s of the idler gear 48 do not mesh each other, the inner circumferential teeth 56s and the outer circumferential teeth 54s have respective pairs of inclined tooth surfaces such that tooth thicknesses increase as the teeth 54s and 56s approach each other, that is, are closer each other. An angle θ of FIG. 5 indicates an angle formed between a plane passing through the axial center C and a contact surface H on which the first tooth surface 86 and the second tooth surface 88 are mate each other in a state that the inner circumferential teeth 56s of the sleeve 56 and the outer circumferential teeth 54s of the idler gear 48 mesh each other. An arrow Fs of FIG. 5 indicates a thrust force Fs input to the inner circumferential teeth 56s of the sleeve 56 according to an input torque T such as a transmission torque on the contact surface H. The thrust force Fs is input in an engagement direction A of the sleeve 56 to the inner circumferential teeth 56s by the contact surface H forming the angle θ. Therefore, the input of the thrust force Fs to the inner circumferential teeth 56s suppresses occurrence of so-called jumping-out of gear causing the sleeve 56 to disengage from the idler gear 48. The magnitude of the thrust force Fs varies depending on the magnitude of the angle θ and the magnitude of the input torque T, the thrust force Fs becomes larger as the contact angle θ increases, and the thrust force Fs also becomes larger as the input torque T increases.

Returning to FIG. 3, a shift fork 60 is attached to one end portion of a fork shaft 92 operated by an actuator 90. The actuator 90 is fixed to a non-rotating member not shown. As shown in FIG. 3, the actuator 90 includes a piston 94 fixed to the other end of the fork shaft 92, an O-ring 98 fitted into a circumferential groove 96 formed on an outer circumferential surface of the piston 94, and a cylinder 100 slidably housing the piston 94, and a hydraulic pressure chamber 102 formed by the piston 94, the O-ring 98, and the cylinder 100. The piston 94 is always pressed by an urging force Fsp of a return spring 104 in the direction of contraction of the hydraulic pressure chamber 102. Therefore, in this example, the actuator 90 functions as a hydraulic actuator which reciprocatingly drives the fork shaft 92 in the axial center C direction by using hydraulic pressure output from the oil pump 41 driven in accordance with rotary drive of the engine 12. The O-ring 98 functions as a seal member. The cylinder 100 functions as a piston housing portion. The sleeve 56 is coupled to the piston 94 via the fork shaft 92 and the shift fork 60

As shown in FIG. 3, the shift fork 60 has a base end portion 60a attached to the one end portion of the fork shaft 92 and a leading end portion 60b extending in a curved manner from the base end portion 60a. The base end portion 60a and the fork shaft 92 are fastened by one or more fastening bolts 110. The base end portion 60a is provided with insertion holes 112 for allowing insertion of the fastening bolts 110. The fork shaft 92 is provided with threaded holes 114 for fastening the fastening bolts 110. The leading end portion 60b extends from the base end portion 60a toward the axial center C, i.e., toward the sleeve 56 disposed concentrically with the axial center C, and the leading end portion 60b is formed into a bifurcated shape. The leading end portion 60b of the shift fork 60 is formed such that the leading end portion 60b can be fitted into an annular outer circumferential recessed groove 72 formed on the outer circumferential surface of the sleeve 56.

As shown in FIGS. 3 and 4, a pair of sliding pads 62a and 62b, i.e., a so-called shift fork pad, is disposed as a friction material made of a material having high antifriction performance on a pair of contact surfaces of the leading end portion 60b of the shift fork 60 which is in contact with and opposed to a pair of side wall surfaces 72a and 72b the outer circumferential recessed groove 72. The sliding pad 62 is fixed to the both surface of the leading end portion 60b by an adhesive, for example by vibrational adhesion of the sliding pads 62a and 62b. The sliding pad 62 disposed on the leading end portion 60b is brought into contact with side wall surfaces of the outer circumferential recessed groove 72 due to movement of the shift fork 60. When the sleeve 56 is moved in the engagement direction A, the sliding pad 62b is brought into contact with the side wall surface of the outer circumferential recessed groove 72 on the idler gear 48 side.

According to the actuator 90 configured as described above, for example, a hydraulic oil is regulated in pressure by using as a source pressure a hydraulic pressure from the oil pump 41 rotated by the engine 12 and is supplied to the hydraulic pressure chamber 102, so that a thrust F is generated as a pressing force against the urging force Fsp of the return spring 104, which causes an engagement force, i.e., an engagement load Fb, to act on the sleeve 56 for moving the sleeve 56 in the engagement direction A via the fork shaft 92 and the shift fork 60. If the hydraulic oil pressure supplied to the hydraulic pressure chamber 102 becomes equal to or greater than a predetermined hydraulic pressure, a thrust F of the actuator 90 causes the sleeve 56 to move to the engagement position P2 at which the inner circumferential teeth 56s of the sleeve 56 is meshed with the outer circumferential teeth 54s of the idler gear 48. When the sliding pad 62 is brought into contact with the side wall surface of the outer circumferential recessed groove 72, a contact surface pressure, i.e., a sliding surface pressure based on the engagement load Fb acts on a contact surface between the shift fork 60 that is a non-rotating member and the sleeve 56 that is a rotating member, i.e., a surface of the sliding pad 62b coming into contact with the side wall surface of the outer circumferential recessed groove 72.

As shown in FIGS. 3 and 4, when the sleeve 56 is located at the engagement position P2 where the inner circumferential teeth 56s of the sleeve 56 is meshed with the outer circumferential teeth 54s of the idler gear 48, the sleeve 56 is held in contact with the side surface 48a of the meshing teeth of the idler gear 48. As shown in FIGS. 3 and 4, the sleeve 56 is provided with the projection 56a projected toward the idler gear 48 on an end surface facing the idler gear 48. Therefore, when the sleeve 56 is located at the engagement position P2, the projection 56a is brought into contact with the side surface 48a of the meshing teeth of the idler gear 48, so that a position of the sleeve 56 is established, and the projection 56a is held in contact with the side surface 48a of the meshing teeth of the idler gear 48 by the thrust F of the actuator 90. As shown in FIG. 3, when the projection 56a is held in contact with the side surface 48a of the meshing teeth of the idler gear 48 by the thrust F of the actuator 90, a gap S is formed between the cylinder 100 and the shift fork 60.

Figure 6:
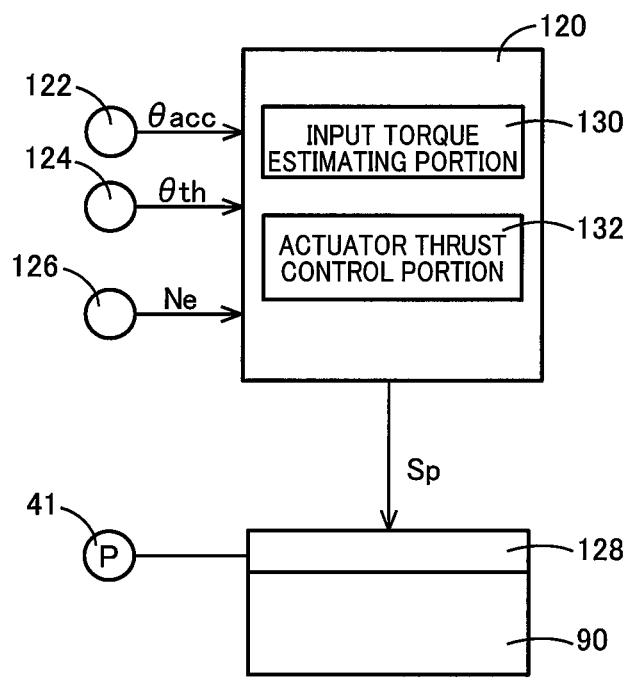
FIG. 6 is a diagram for explaining a control function and a control system for various controls in the vehicle of FIG. 1.

FIG. 6 is a functional block diagram for explaining main portions of a control function of an electronic control device 120 disposed in the vehicle 10 of FIG. 1. The electronic control device 120 is configured to include a microcomputer as a control device of the vehicle 10 and executes a signal process according to a program stored in advance in a ROM, while a temporary storage function of a RAM is utilized, so that various controls of the vehicle 10 are provided. The electronic control device 120 is supplied with various actual values based on detection signals from various sensors and is supplied with a signal indicative of an accelerator opening degree θacc (%) from an accelerator opening degree sensor 122 and a signal indicative of a throttle valve opening degree θth (%) from a throttle valve sensor 124. The electronic control device 120 is also supplied with a signal indicative of an engine rotation speed Ne (rpm) from an engine rotation speed sensor 126, a signal indicative of a vehicle speed V from a vehicle speed sensor not shown, etc. The electronic control device 120 outputs an actuator control signal Sp for connecting/disconnecting the second power transmission path PT2 to a hydraulic control circuit 128 to control the thrust F of the actuator 90 by controlling the hydraulic pressure supplied to the hydraulic pressure chamber 102 of the actuator 90 from the hydraulic control circuit 128.

The electronic control device 120 functionally includes as main portions of the control function a means of estimating the input torque T, i.e., an input torque estimating portion 130, and an actuator thrust control means, i.e., an actuator thrust control portion 132.

The input torque estimating portion 130 estimates a torque, i.e., the input torque T which is input to the gear mechanism counter shaft 44, transmitted between the first rotating shaft, i.e., the gear mechanism counter shaft 44, and the second rotating shaft, i.e., the output shaft 30, from the characteristics of the engine 12. For example, the input torque estimating portion 128 estimates the input torque T the engine output torque determined based on the actual engine rotation speed Ne, the throttle valve opening degree θth, etc using the previously stored relationship and the gear ratio between the input shaft 22 and the gear mechanism counter shaft 44.

The actuator thrust control portion 132 implements a control of the supplied hydraulic pressure supplied to the hydraulic pressure chamber 102 of the actuator 90 from the hydraulic control circuit 128, that is, the thrust F of the actuator 90 based on the actual input torque T from a previously stored relationship shown in FIG. 7, for example, such that the load FC1 (hereinafter, referred to the C-surface load) which the projection 56a of the sleeve 56 comes into contact with the side surface 48a of the idler gear 48 is an appropriate value in the case that it is changed from a state that the sleeve 56 and the idler gear 48 are not meshed with each other to a state that the sleeve 56 and the idler gear 48 are meshed with each other.

Figure 7:
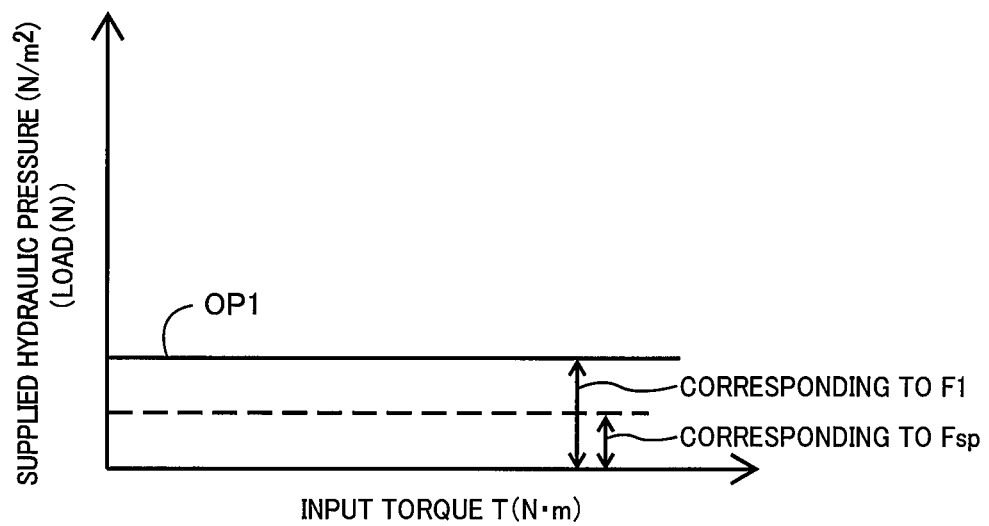
FIG. 7 is a diagram for explaining a control operation of the electronic control device of FIG. 6 and indicating the supplied hydraulic pressure supplied to the actuator of FIG. 3.
Figure 8:
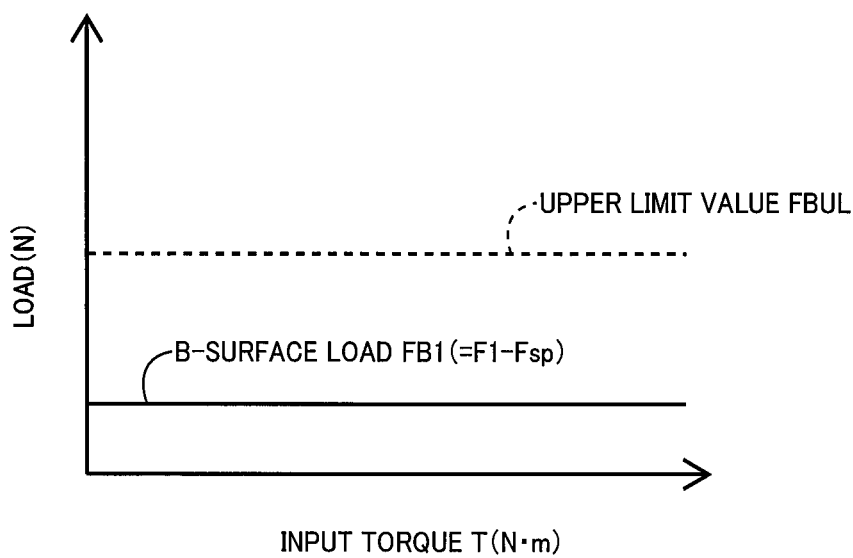
FIG. 8 is a diagram for explaining the B-surface load between the sliding pad and the sleeve which is generated by the supplied hydraulic pressure supplied to the actuator of FIG. 7.

The thrust F1 of the actuator 90 generated based on the supplied hydraulic pressure OP1 shown in FIG. 7 is offset by an urging force of the return spring 104 and, accordingly, the load FB1 (hereinafter, referring to B-surface load) due to pressing of the sliding pad 62b to the side wall surface 72b on the idler gear 48 side of the pair of the side wall surfaces 72a and 72b of the outer circumferential recessed groove 72 of the sleeve 56 by the actuator 90 is the difference (F1−Fsp) between the thrust F1 of the actuator 90 and the urging force Fsp of the return spring 104 as shown in FIG. 8. As shown in FIG. 8, the supplied hydraulic pressure OP1, that is, the B-surface load FB1 generated based on it is determined so that it is a sufficiently lower value than the upper limit value FBUL of the range in which no abrasion occurs on the sliding pad 62b and the jumping-out of gear does not occur.

Figure 9:
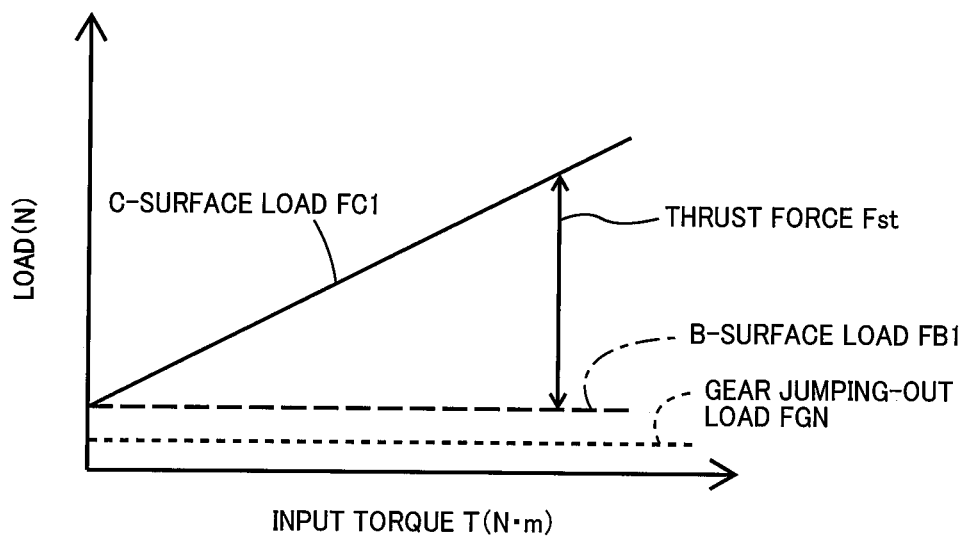
FIG. 9 is a diagram for explaining the C-surface load between the sleeve and the idler gear which is generated by the supplied hydraulic pressure supplied to the actuator of FIG. 7 and the thrust force drawing to the idler gear side according to the input torque.

In the state that the sleeve 56 is at the engagement position P2, as the input torque T increases, by an inclination of the first tooth surfaces 86 of the outer circumferential teeth 54s and the second tooth surfaces 88 of the idler gear 48 which are meshed with each other, according to the input torque T, the thrust force Fst for drawing to the idler gear 48 side increases. Accordingly, as shown in FIG. 9, as the increase of the input torque T, the C-surface load FC1 increases, an amount over the gear jumping-out load FGN is increased. Utilizing such characteristics, in the relationship shown in FIG. 7, it may be possible to improve the fuel consumption by reducing the B-surface load FB1 and C-surface load FC1 than those as shown in FIGS. 8 and 9 by reducing the supplied hydraulic pressure OP1 along with the increase of the input torque T in the range that the C-surface load FC1 is not lower than the gear jumping-out load FGN. An example of it is described in the following Example 2.

The control of the actuator 90 as described above suppresses the vibrations of the sleeve 56 because the projection 56a of the sleeve 56 is caught by the shift fork 60 and the idler gear 48 therebetween. Further, rattling noises generated when switched between the driving state and the driven state and when non-load running can be suppressed.

In the conventional case that the sleeve 56 and the idler gear 48 are not in contact with each other and the projection 56a of the sleeve 56 is not caught by the shift fork 60 and the idler gear 48 therebetween, the thrust F1 of the actuator 90 is generated based on the supplied hydraulic pressure OP1 as shown in FIG. 7, the inner circumferential teeth 56s of the sleeve 56 and the outer circumferential teeth 54s of the idler gear 48 are meshed completely, then, as the input torque T increases, according to the input torque T thrust force Fst for drawing to the idler gear 48 side increases due to the inclination of the first tooth surface 86 of the outer circumferential teeth 54s and the second tooth surface 88 of the idler gear 48 which mesh with each other. Accordingly, the load (hereinafter, referred to A-surface load) that the sliding pad 62a is pressed to the side wall surface 72a of the outer circumferential recessed groove 72 of the sleeve 56 by the thrust force Fst increases as the above-described input torque T increases, and exceeds the upper limit value FBUL of a range that no abrasion occurs on the sliding pad 62a, and, accordingly, abrasion of the sliding pad 62a occurs.

As described above, according to the dog clutch D1 of the vehicle power transmission device 16 of this example, the inner circumferential teeth 56s and the outer circumferential teeth 54s have the first tooth surfaces 86 and the second tooth surfaces 88 making the tooth thicknesses larger as the teeth 56s and 54s approach each other, and when the sleeve 56 is moved to the engagement position P2 by the shift fork 60, the sleeve 56 is held in contact with the side surface 48a of the idler gear 48. Therefore, when the sleeve 56 is moved to the engagement position P2 by the shift fork 60, the sleeve 56 is held such that the sleeve 56 is in contact with the side surface 48a of the idler gear 48, and therefore, for example, as compared to a case where the sleeve 56 is brought into contact with the shift fork 60 to position the sleeve 56 against the thrust force Fs generated due to the inclined tooth surfaces 86, 88, the contact surface pressure can be reduced between the sleeve 56 and the shift fork 60, i.e., the sliding surface pressure of the contact surface can be reduced between the sleeve 56 and the shift fork 60. Thus, the abrasion of the sliding pad 62 brought into sliding contact with the side wall surface of the outer circumferential recessed groove 72 can be suppressed by the sliding between the sleeve 56 that is the rotating member and the shift fork 60 that is the non-rotating member.

According to this example, the projection 56a projected toward the idler gear 48 is formed on the surface of the sleeve 56 facing the idler gear 48, and while the sleeve 56 is located at the engagement position P2, the projection 56a is brought into contact with the side surface 48a of the idler gear 48. As a result, the sleeve 56 is reliably brought into contact with the side surface 48a of the idler gear 48, so that the sleeve 56 is more reliably held at the engagement position P2 with the sleeve 56 in contact with the side surface 48a of the idler gear 48.

According to this example, the synchronizer ring 58 is disposed between the hub 52 and the idler gear 48 and prevents the movement of the sleeve 56 to the engagement position P2 until synchronization of rotation speeds is completed between the outer circumferential teeth 54s and the inner circumferential teeth 56s. As a result, rotation speeds can smoothly be synchronized between the gear mechanism counter shaft 44 and the idler gear 48.

According to this example, the outer circumferential teeth 54s of the idler gear 48 are integrally formed on the side surface 48a side of the idler gear 48. As a result, the outer circumferential teeth 54s can be reduced in the number of parts and the number of manufacturing steps as compared to when a gear piece having the outer circumferential teeth 54s is fixed to the idler gear 48 provided with meshing teeth for meshing with the output gear 50, so that costs can be reduced.

According to this example, while the sliding pad 62 is fixed to a portion or a whole of the contact surface of the shift fork 60 (the leading end portion 60b) facing the side wall surface of the outer circumferential recessed groove 72 of the sleeve 56, and while the sleeve 56 is held at the engagement position P2 by the thrust F from the actuator 90, the sliding pad 62 is brought into sliding contact with the side wall surface of the outer circumferential recessed groove 72. As a result, abrasion due to sliding between the rotating sleeve 56 and the non-rotating shift fork 60 can be suppressed, and particularly, the abrasion of the sliding pad 62 can be suppressed.

According to this example, the actuator 90 is a hydraulic actuator having a thrust F generated by a hydraulic pressure. As a result, the thrust F of the actuator 90 can appropriately be controlled by the hydraulic pressure, so that when the sleeve 56 is moved to the engagement position P2 by the shift fork 60, the position of the sleeve 56 can more properly be held such that the sleeve 56 is in contact with the side surface 48a of the idler gear 48. Therefore, the occurrence of jumping-out of gear can more reliably be suppressed, and abrasion of a member can further be suppressed by sliding between the rotating sleeve 56 and the non-rotating shift fork 60. Additionally, since the position of the sleeve 56 can be controlled by the thrust F of the actuator 90, this can reduce vibration noises of the sleeve 56 at the time of light load or no load when the input torque T becomes small, for example.

According to this example, the thrust F of the actuator 90 is controlled based on a torque transmitted between the gear mechanism counter shaft 44 and the output shaft 30. For example, if the so-called input torque T, i.e., the torque transmitted between the gear mechanism counter shaft 44 and the output shaft 30, is relatively high, the control is provided to make the thrust F of the actuator 90 smaller as compared to when the input torque T is relatively low. As a result, the thrust F of the actuator 90 is properly lowered according to the input torque T, and therefore, when the sleeve 56 is moved to the engagement position P2 by the shift fork 60, sliding resistance between the sleeve 56 and the shift fork 60 can be reduced to improve the fuel consumption.

According to this example, the vehicle power transmission device 16 is a parallel power transmission device that includes the first power transmission path PT1 transmitting a torque from the input shaft 22 to the output shaft 30 via the continuously variable transmission 24, and the second power transmission path PT2 disposed parallel to the first power transmission path PT1 and transmitting a torque from the input shaft 22 to the output shaft 30 via the gear mechanism 28, and includes a clutch mechanism alternatively switching the first power transmission path PT1 and the second power transmission path PT2. The dog clutch D1, which is a component of the clutch mechanism, is disposed in series in the second power transmission path PT2. As a result, the running pattern can be switched by the clutch mechanism in accordance with respective vehicle statuses, such as a low vehicle speed and a high vehicle speed, to the CVT running mode in which a torque is transmitted through the first power transmission path PT1 or the gear running mode in which a torque is transmitted through the second power transmission path PT2, and the second power transmission path PT2 can completely be interrupted by releasing the dog clutch D1 to prevent a torque from the drive wheel 14 side during running of the vehicle 10 from being input to the gear mechanism 28. Therefore, since the power transmission path can be selected in accordance with a vehicle status for performing efficient running, the fuel consumption can be improved.

Example 2

Figure 10:
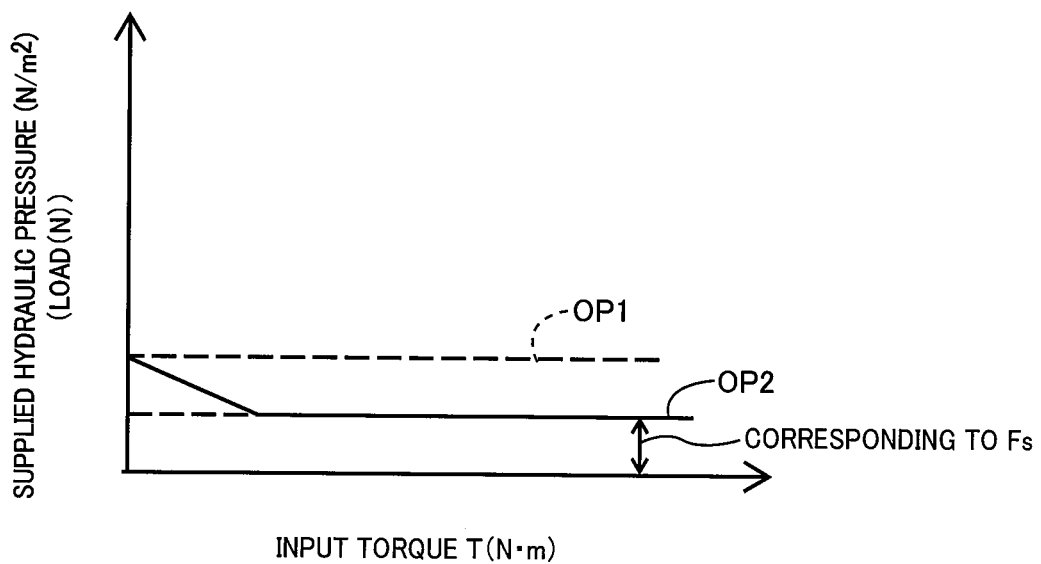
FIG. 10 is a diagram for explaining another control operation of the electronic control device of FIG. 6 and indicating the supplied hydraulic pressure supplied to the actuator of FIG. 3.
Figure 11:
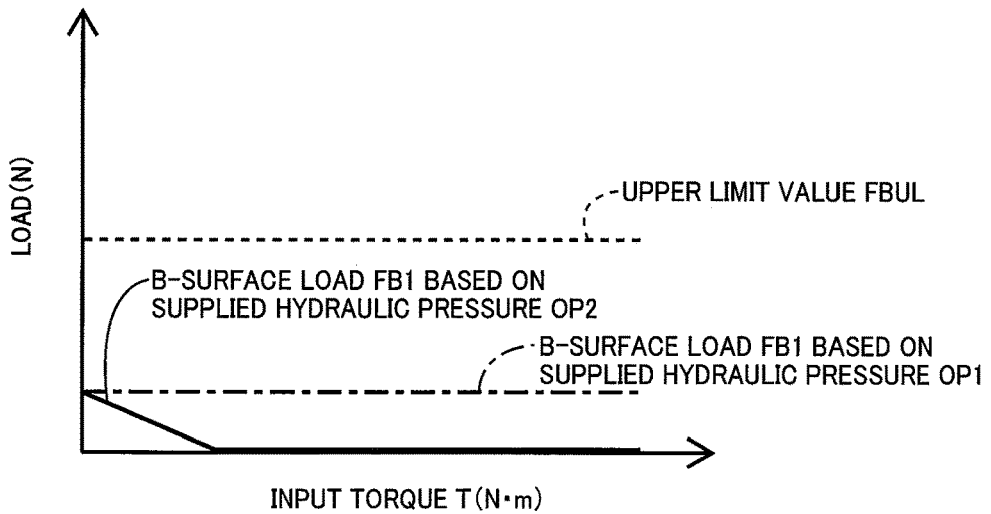
FIG. 11 is a diagram for explaining the B-surface load between the sliding pad and the sleeve which is generated by the supplied hydraulic pressure supplied to the actuator of FIG. 10.
Figure 12:
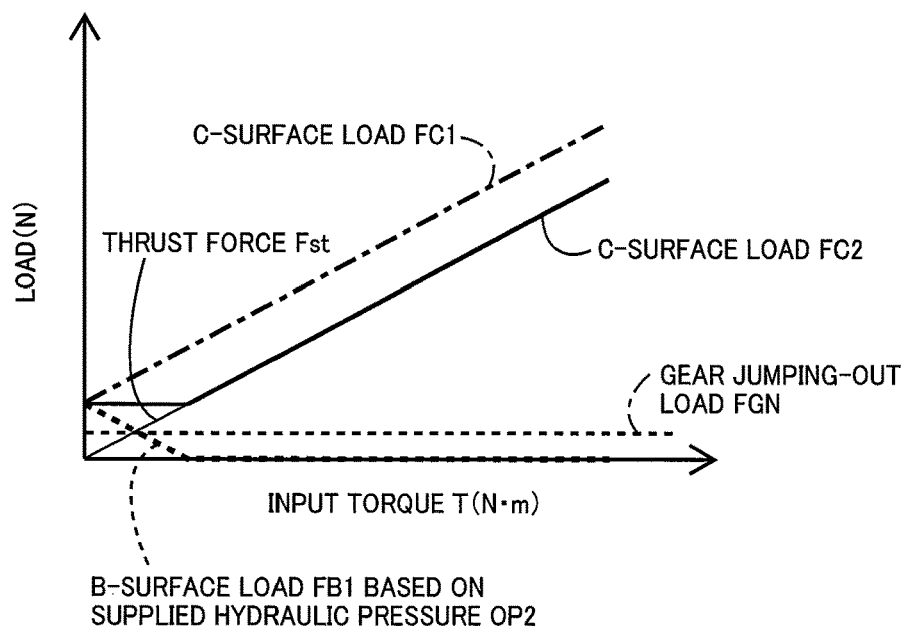
FIG. 12 is a diagram for explaining the C-surface load between the sleeve and the idler gear which is generated by the supplied hydraulic pressure supplied to the actuator of FIG. 10 and the thrust force drawing to the idler gear side according to the input torque.

FIGS. 10, 11 and 12 are diagrams for explaining another control examples by the actuator thrust control portion 132 of the electronic control device 120. As shown in FIG. 10, the actuator thrust control portion 132 of this example reduces the supplied hydraulic pressure OP2 supplied to the hydraulic pressure chamber 102 from OP1 to a constant value until the input torque T reaches the predetermined value and, then, maintains it at the predetermined value. FIG. 11 shows the supplied hydraulic pressure OP2, that is, the B-surface load FB2 generated based on it. In a specially high input torque area, B-surface load FB2 is a further lower value than the upper limit value FBUL of a range that no abrasion occurs on the sliding pad 62b in comparison with the Example 1.

In the state that the sleeve 56 is at the engagement position P2, as the input torque T increases, by an inclination of the first tooth surfaces 86 of the outer circumferential teeth 54s and the second tooth surfaces 88 of the idler gear 48 which are meshed with each other, according to the input torque T, the thrust force Fst for drawing to the idler gear 48 side increases. Accordingly, as shown in FIG. 12, as the increase of the input torque T, the C-surface load FC2 increases, an amount over the gear jumping-out load FGN is increased. The C-surface load FC2 of this case is lower than the C-surface load FC1 of the Example 1.

According to this example, in addition to the equivalent effect to the above-described Example 1 which can be obtained, since the above-mentioned C-surface load FC2 is lower than the C-surface load FC1 of the Example 1, the fuel consumption can be improved corresponding to the reduction.

Although the preferred example of the present invention has been described in detail with reference to the drawings, the present invention is not limited thereto and is implemented in other forms.

For example, in the example described above, the actuator 90 is a hydraulic device operated by a hydraulic pressure; however, the present invention is not limited thereto, and the actuator may be an electrically controllable electromagnetic actuator, for example.

Although the example of the present invention has been described in detail with reference to the drawings, the above description is merely an embodiment, and although not exemplarily illustrated one by one, the present invention can be implemented in variously modified and improved forms based on the knowledge of those skilled in the art without departing from the spirit thereof.

REFERENCE SIGNS LIST

16: vehicle power transmission device
30: output shaft (second rotating shaft)
44: gear mechanism counter shaft (first rotating shaft)
48: idler gear (first gear)
50: output gear (second gear)
52: hub
54s: outer circumferential teeth
56: sleeve
56a: projection
56s: inner circumferential teeth
58: synchronizer ring
60: shift fork
62a, 62b: sliding pad
72: outer circumferential recessed groove
86: first tooth surface (inclined tooth surface)
88: second tooth surface (inclined tooth surface)
90: actuator
132: actuator thrust control portion
C: axial center (one axis, axis)
D1: dog clutch with a synchromesh mechanism (dog clutch)
P1: neutral position
P2: engagement position
F, F1, F2, F3: thrust of the actuator 90
T, T1, T2, T3: input torque

What is claimed is:

1. A dog clutch of a vehicle power transmission device, the vehicle power transmission device including a first gear disposed relatively rotatably on a first rotating shaft rotating around an axis,
    a second gear fixed to a second rotating shaft parallel to the first rotating shaft and constantly meshed with the first gear, and
    a shift fork driven to reciprocate along the axis by an actuator driving the dog clutch,
    the dog clutch comprising:
    a sleeve supported movably in a direction of the axis and relatively non-rotatably to the first rotating shaft by the first rotating shaft via a hub disposed relatively non-rotatably to the first rotating shaft on the first rotating shaft and the sleeve including an annular outer circumferential recessed groove formed on the outer circumferential side to be engaged with the shift fork in a slidable manner,
    the dog clutch connecting/disconnecting the first rotating shaft to/from the first gear by moving the sleeve between a neutral position at which inner circumferential teeth formed on the inner circumferential side of the sleeve are not meshed with outer circumferential teeth on a side surface side of the first gear and an engagement position at which the inner circumferential teeth are meshed with the outer circumferential teeth, wherein
    the inner circumferential teeth and the outer circumferential teeth have inclined surfaces tooth thicknesses of which become larger as the inner circumferential teeth and the outer circumferential teeth approach each other, and wherein
    when the sleeve is moved to the engagement position by the shift fork, the sleeve is held in contact with a side surface of the first gear.

2. The dog clutch of a vehicle power transmission device according to claim 1, wherein
    a projection projected toward the first gear is formed on a surface of the sleeve facing the first gear, and wherein
    when the sleeve is located at the engagement position, the projection is brought into contact with the side surface of the first gear.

3. The dog clutch of a vehicle power transmission device according to claim 1, wherein
    a synchronizer ring is disposed between the hub and the first gear and prevents the sleeve from moving to the engagement position until synchronization of rotations is completed between the outer circumferential teeth and the inner circumferential teeth.

4. The dog clutch of a vehicle power transmission device according to claim 1, wherein the outer circumferential teeth are integrally formed on the side surface side of the first gear.

5. The dog clutch of a vehicle power transmission device according to claim 1, wherein a sliding pad is fixed to a portion or a whole of a contact surface of the shift fork facing a side wall surface of the sleeve in the outer circumferential recessed groove, and wherein when the sleeve is held at the engagement position by a thrust from the actuator, the sliding pad is brought into sliding contact with the side wall surface in the outer circumferential recessed groove.

6. The dog clutch of a vehicle power transmission device according to claim 1, wherein the actuator is a hydraulic actuator generating a thrust by a hydraulic pressure.

7. The dog clutch of a vehicle power transmission device according to claim 6, wherein the thrust of the actuator is controlled based on a torque transmitted between the first rotating shaft and the second rotating shaft.

8. The dog clutch of a vehicle power transmission device according to claim 1, wherein the vehicle power transmission device is a parallel type power transmission device including a first power transmission path transmitting a power from an input shaft to an output shaft via a belt-type continuously variable transmission and a second power transmission path disposed parallel to the first power transmission path and transmitting a power from the input shaft to the output shaft via a reduction gear mechanism and the vehicle power transmission device further including a clutch mechanism alternatively switching the first power transmission path and the second power transmission path, and wherein the dog clutch is disposed in series with the reduction gear mechanism in the second power transmission path.

9. The dog clutch of a vehicle power transmission device according to claim 6, wherein the vehicle power transmission device includes an actuator thrust control portion for controlling a supplied hydraulic pressure to be supplied to the hydraulic actuator in order that the hydraulic actuator generates the thrust in a direction that the sleeve is in contact with the side surface of the first gear, the actuator thrust control portion maintains the supplied hydraulic pressure constant regardless of an input torque transmitted to the first rotating shaft or reduces the supplied hydraulic pressure as an increase of the input torque.

* * * * *